March 18, 1924.
A. F. FOLSOM
WHEEL RIM TOOL
Filed Oct. 17, 1923
1,487,648
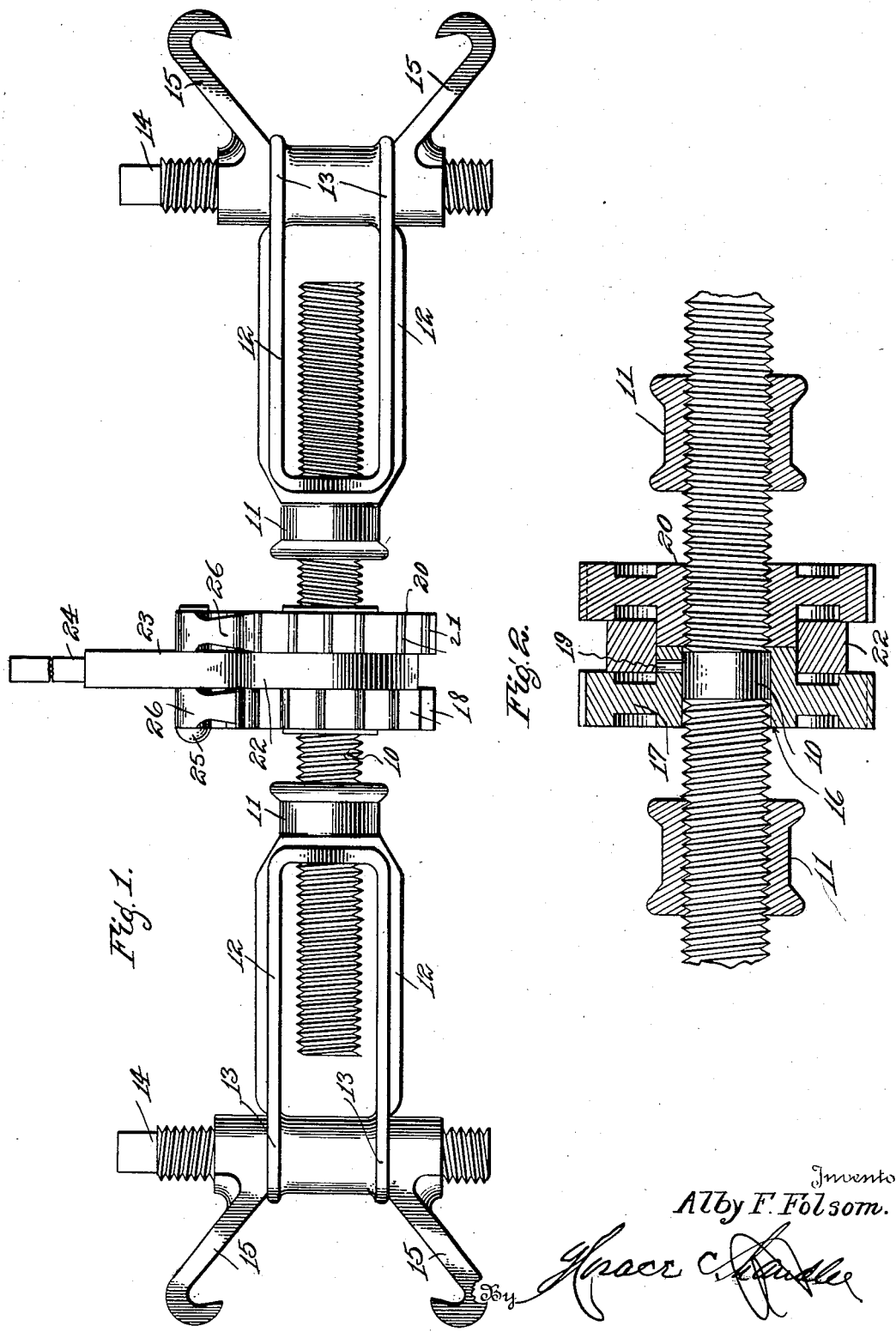

Patented Mar. 18, 1924.

1,487,648

UNITED STATES PATENT OFFICE.

ALBY F. FOLSOM, OF JACKSON, MICHIGAN.

WHEEL-RIM TOOL.

Application filed October 17, 1923. Serial No. 669,129.

*To all whom it may concern:*

Be it known that I, ALBY F. FOLSOM, a citizen of the United States, residing at Jackson, in the county of Jackson, State of Michigan, have invented certain new and useful Improvements in Wheel-Rim Tools; and I do hereby declare the following to be a full, clear, and exact description of the invention, such as will enable others skilled in the art to which it appertains to make and use the same.

This invention relates to new and useful improvements in wheel rim devices and particularly to tools for expanding and contracting the rims of automobile wheels, to permit the easy application and removal of the tire from the rim.

One object of the invention is to provide a device of this character which includes clamps carried on the opposite ends of an oppositely threaded bar, and a novelly constructed and applied means for rotation of the bar.

Another object is to so form the rotating means that said means may be easily and quickly applied to the threaded bar, and once applied cannot become displaced during the operation of the device.

Other objects and advantages will be apparent from the following description when taken in connection with the accompanying drawing.

In the drawing:

Figure 1 is an elevation of a rim expanding and contracting device made in accordance with the invention.

Figure 2 is an enlarged vertical longitudinal central sectional view through the intermediate portion of the device, to show the manner of mounting the ratchet wheels on the threaded bar.

Referring particularly to the accompanying drawing, 10 represents a bar which has its opposite end portions oppositely threaded, and engaged on these end portions are the collars 11 which have the longitudinally and outwardly extending parallel arms 12, terminating in eyes 13. Engaged through the eyes of each of the pair of arms 12 is an oppositely threaded bolt 14 on each end of which is engaged a rim engaging jaw 15, of a clamp.

Disposed on the intermediate portion of the bar 10 is a collar 16, which has a radial flange 17 on one end, which flange is peripherally formed with ratchet teeth 18. A pin 19, engaged through the collar and the bar 10 holds the collar immovable in relation to the bar. Threaded onto the bar 10 and bearing against the end of the collar 16, is a disk 20, of a diameter and thickness equal to that of the flange 17, and peripherally formed with ratchet teeth 21, extending in a direction opposite to that of the teeth 18. Engaged rotatably on the collar, between the flange and disk, is a ring 22 which has a hollow stem 23 extending from its periphery for the reception of one end of a handle lever 24. Extending transversely through the stem 23 is a pin 25, and pivotally mounted on each end of this pin is a pawl 26, each pawl being arranged to engage with the teeth of the flange 17 or disk 20, and being directed oppositely. It will be readily seen that when the collar or ring 22 is rocked in one direction one of the pawls 26 will engage the teeth of the flange or disk, while the other pawl is thrown back out of engagement with the other teeth, whereby the bar 10 will be rotated in one direction to move the collars 11 in one direction longitudinally of the bar, and in the opposite direction when the pawls are reversed.

Attention is directed to the fact that the collar 16 is fixed to the bar 10 by means of the pin 19, whereby movement or rotation of the collar on the bar is effectively prevented, while the disk 20, being screwed onto the bar, and tightly against the end of the collar 16, will tend to screw in the direction of the collar, upon rotation thereof by the appropriate pawl 26. Rotation of the disk 20 will never be in a direction away from the collar 16, with the result that no other means than the engagement of the threads of the collar with the threads of the bar 10, will be necessary to hold the collar tightly bound against the collar 16.

What is claimed is:

1. In an expanding and contracting device, an oppositely threaded bar, clamping means movable on the ends of the bar, a collar fixed on the intermediate portion of the bar in relation to the threads of one end of said bar, a disk threaded on the threads of the other end of the bar and operable in a direction to constantly urge the disk against said collar.

2. In an expanding and contracting device, an oppositely threaded bar, clamps movable on the ends of the bar, a collar fixed on the intermediate portion of the bar and rotatable with the bar in the operation of the device, the collar having a toothed flange, a pawl carrying member rotatable on the collar, and a disk threaded on the bar against the end of the collar, and being operable by a pawl in a direction to maintain said disk in binding relation to said collar.

In testimony whereof, I affix my signature, in the presence of two witnesses.

ALBY F. FOLSOM.

Witnesses:
H. A. REECE,
M. T. MALONEY.